April 29, 1969   R. L. STEDFELD   3,441,695
RATE OF FLUID PRESSURE CHANGE SENSOR FOR EFFECTING A SIGNAL
Filed Nov. 14, 1966

INVENTOR.
BY Rowland L. Stedfeld
George E. Johnson
ATTORNEY

United States Patent Office 3,441,695
Patented Apr. 29, 1969

3,441,695
RATE OF FLUID PRESSURE CHANGE SENSOR FOR EFFECTING A SIGNAL
Rowland L. Stedfeld, Indianapolis, Ind., assignor to General Motors Corporation, Detroit, Mich., a corporation of Delaware
Filed Nov. 14, 1966, Ser. No. 594,154
Int. Cl. H01h 35/24, 35/36
U.S. Cl. 200—81                                       5 Claims

ABSTRACT OF THE DISCLOSURE

This invention relates to sensors and more particularly to sensors of predetermined fluid pressure rate changes, as distinguished from mere changes in extent of fluid pressures, for effecting a warning signal or circuit. One purpose of such a sensor would be to detect a sudden leak in a gas line despite the widely varied pressures to which main gas schedules may be subjected and accordingly give rise to a signal or ameliorating effect.

---

An objective of the present invention is to provide a device by means of which a predetermined rate of fluid pressure change in a fluid pressure source such as a pipe line or container may be made effective on a circuit giving a warning or operating offsetting equipment.

One feature of the present invention is a sensor device including a Bourdon tube and an accelerometer in combination type of switch. Another feature of this invention is a rate of fluid pressure change sensor including a flexible diaphragm separating two fluid chambers except for a calibrated aperture connecting the two chambers, movement of the diaphragm being adapted to control in electrical circuit. Another feature is a fluid pressure rate of change sensor including a resilient bellows separating two pressure chambers except for an aperture calibrated to predetermine a rate of fluid pressure change in one of the chambers whereby a signal is effected when that rate is attained.

Other features of the invention will become more apparent as the description proceeds.

Figure 1:
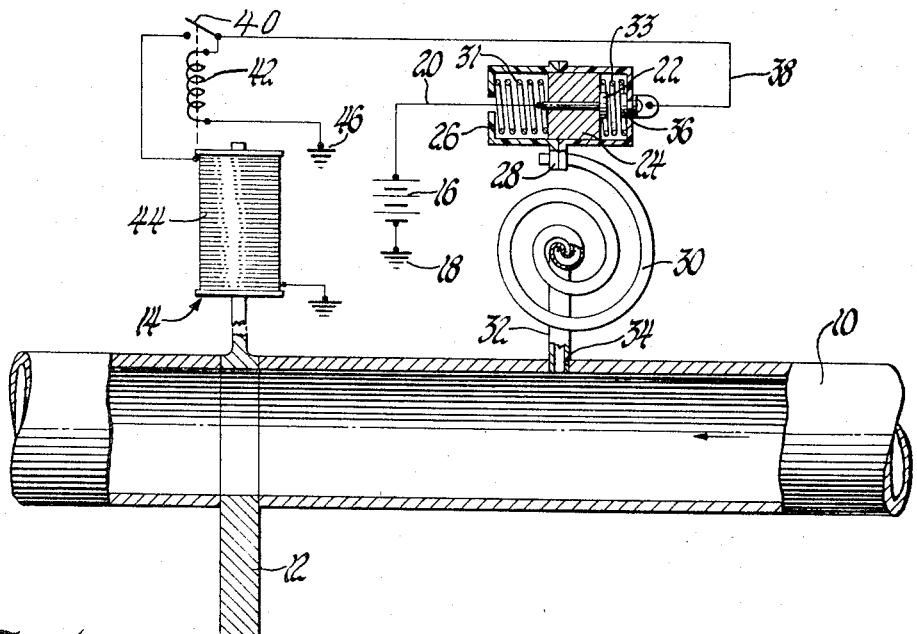
Figure 2:
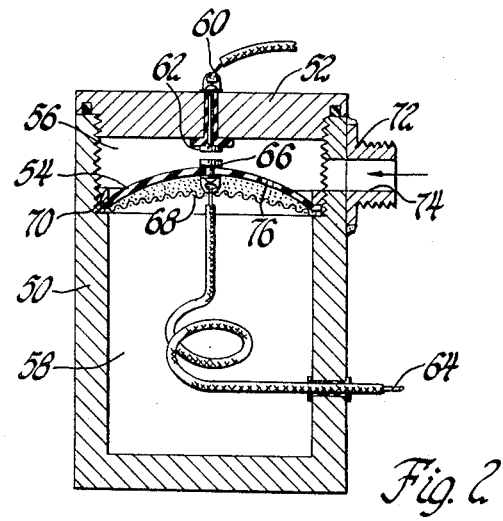
Figure 3:
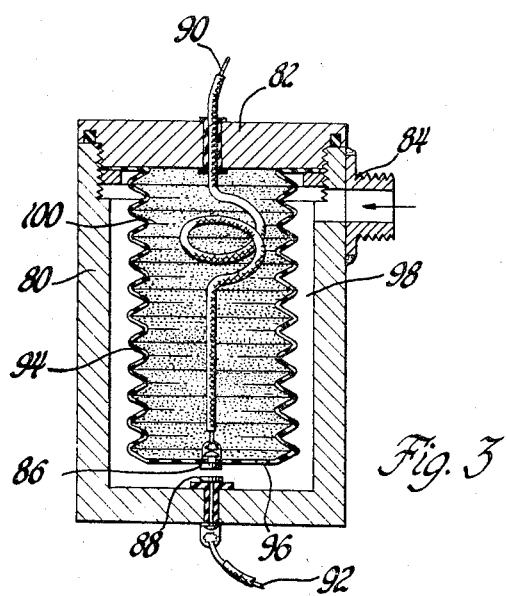

In the drawings:
FIGURE 1 is a diagrammatic view of a gas line associated with a pressure rate of change sensor for controlling the gas line as one embodiment of the present invention;
FIGURE 2 is a cross sectional view of an alternative form of pressure rate change sensor and switch arrangement embodying the present invention and utilizing a flexible diaphragm; and
FIGURE 3 is a third alternative somewhat similar to that of FIGURE 2 but utilizing a resilient bellows.

In FIGURE 1 a source of gas pressure is shown as the gas line 10, this line being controlled by a gate valve indicated at 12. The valve in turn is adapted to be opened or closed by a solenoid arrangement 14. A battery 16 is grounded as at 18 and the positive side of the battery is connected by a line 20 to a contact 22 fixed on and movable with an inertia member 24, and the latter is axially slidable within a guide casing 26. The casing is also movable but is attached as at 28 to the movable end of a Bourdon tube 30. The other end of the tube 30 is fixed to and in communication with a tube 32 in turn connected at 34 to the line 10. Springs 31 and 33 tend positively to position the member 24 in a known neutral position.

The casing 26 is so mounted as to be free to move with the free end of tube 30 and it carires a second contact 36 which is in alignment with the contact 22 and which is connected to a line 38 leading to the pole 40 of a pilot solenoid 42 provided to control the current in a coil 44 of the solenoid 14. The pilot solenoid 42 coil is grounded at 46.

In FIGURE 1, a predetermined rate of pressure drop in the gas flow line 10 will cause the Bourdon tube 30 to tend to "wind-up" and when that rate of pressure change is exceeded the gap between the contacts 22 and 36 will close, actuating the relay 42 and the solenoid 14 to change the flow in line 10. If the pressure change in line 10 should be slow, though possibly extensive, the casing 26 and the inertia member 24 will move together and the circuit will not be closed; but if the pressure change is greater than a predetermined amount dictated by the inertia weight 24 and the springs 31 and 33, then the valve 12 will be operative.

In FIGURE 2, a cup-like member 50 is provided with a cover 52 and the interior is divided by a flexible diaphragm 54 into two chambers, 56 and 58. One line 60 of a warning circuit is fixed to a contact 62 exposed within the chamber 56, and another line 64 of that circuit is attached to a contact 66 carried by the flexible diaphragm 54. A screen support 68 is retained with the periphery of the diaphragm 54 in fixed relation with the cup 50 by means of a collar 70. The purpose of the screen 68 is to prevent excessive movement in a downward direction of the diaphragm 54 if such tendency should appear. A fitting 72 is attached to the cup 50 through which a passage 74 is made and which leads to the chamber 56. The diaphragm 54 is provided with a calibrated aperture 76.

In the operation of the sensor version in FIGURE 2, the passage 74 could be connected to the line 10 of FIGURE 1 or the chamber 56 could be considered as the source of the pressure fluid, the pressure rate change of which is to be detected. If no pressure change rate of significance occurs in chamber 56, the pressure in the chamber 58 will be the same as that in the chamber 56. There will be no effect on the diaphragm 54 because of the calibrated leakage by way of the aperture 76. However, if there is a sudden and predetermined rate of drop in the fluid pressure within the chamber 56, the change between the pressure in the chamber 56 and that in the chamber 58 will momentarily be greater than the aperture 76 can compensate for. As a consequence, the contacts 62 and 66 will close and the warning circuit will be effected.

In FIGURE 3 a cup 80 is provided having a cover 82 and an inlet fitting 84. Two contacts 86 and 88 are employed much as in the case of FIGURE 2 for controlling a warning circuit including two lines 90 and 92. In the case of FIGURE 3, however, a resilient bellows 94 is substituted for the diaphragm 54 and an aperture 96 is made of a calibrated size to restrict the flow between the source of fluid pressure which is the chamber 98 outside the bellows 94, and the chamber 100 inside the bellows. The principle of operation for the device of FIGURE 3 is similar to that described for the structure of FIGURE 2, as a predetermined rate of change in the fluid pressure of the chamber 98 will cause the contacts 86 and 88 to close and effect a warning signal.

I claim:
1. A pressure change sensor including a source of fluid pressure, means responsive to a predetermined rate of change in said pressure and independent of the degree of change in said pressure, said means including a Bourdon tube having one end fixed in position and the other end movable, a circuit including a switch controlled by said responsive means, said switch having an inertia member, one contact movable with said other end, a second contact movable with said inertia member, and the said inertia member being slidable with relation to said one contact when said rate of predetermined pressure change is exceeded.

2. A pressure change sensor including a source of fluid pressure, means responsive to a predetermined rate of change in said sensor and independent of a degree of change is said pressure, said means including two pressure chambers separated by a resilient member having an aperture therein, wherein said two pressure chambers are in communication through said aperture, one of said chambers constistuting said source of fluid pressure, and the other of said chambers being closed except for said aperture, a circuit including a switch controlled by said responsive means, said switch including two members having aligned contacts with one of said contacts being on said resilient member.

3. A pressure change sensor as set forth in claim 2, said resilient member being a flexible diaphragm.

4. A pressure change sensor as set forth in claim 2, said resilient member being a flexible bellows, said one of said chambers being exterior to said bellows, and the other of said chambers being within and defined by said bellows.

5. A pressure change sensor as set forth in claim 2, said aperture being calibrated to determine the said predetermined rate of pressure change.

References Cited

UNITED STATES PATENTS

| | | | |
|---|---|---|---|
| 1,414,912 | 5/1922 | Whittingham | 200—81 |
| 2,647,396 | 8/1953 | Aller | 200—81.8 XR |
| 3,230,323 | 1/1966 | Concannon | 200—81 XR |

ROBERT K. SCHAEFER, *Primary Examiner.*

H. BURKS, *Assistant Examiner.*